Nov. 13, 1951    R. K. SEDGWICK    2,575,190
HYDRAULICALLY OPERATED TRANSFER MOLDING PRESS
Filed March 18, 1948
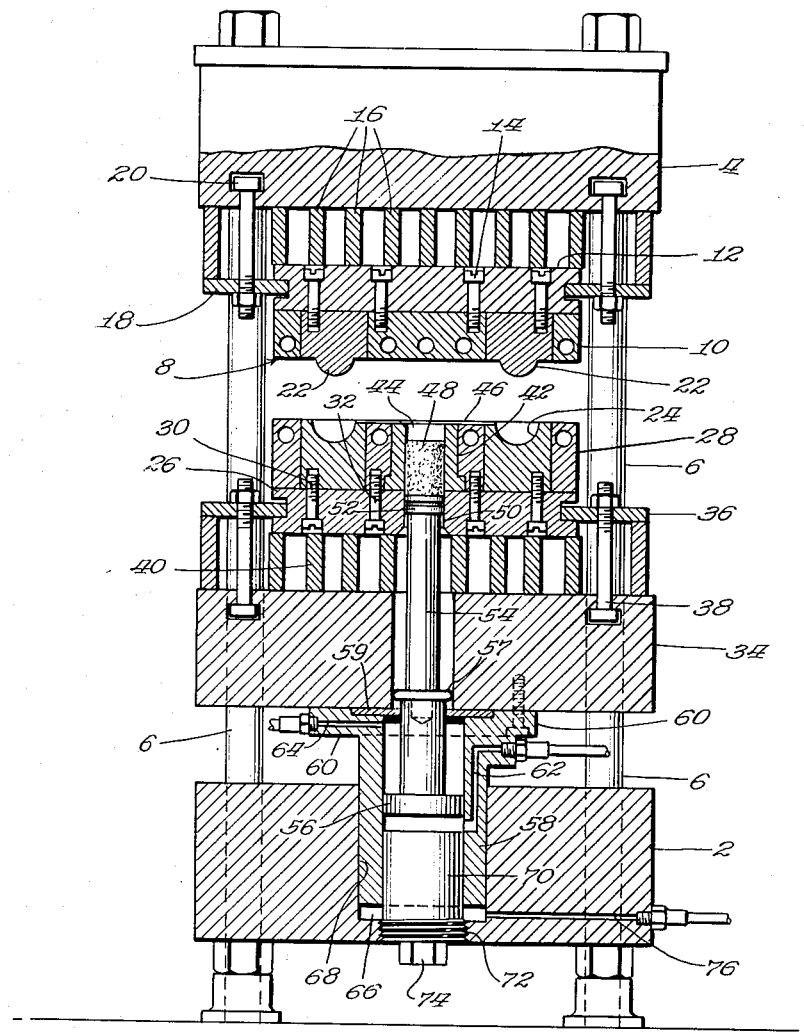
INVENTOR.
Robert K. Sedgwick
BY

UNITED STATES PATENT OFFICE 2,575,190

HYDRAULICALLY OPERATED TRANSFER MOLDING PRESS

Robert K. Sedgwick, Oak Park, Ill., assignor to American Steel Foundries, Chicago, Ill., a corporation of New Jersey Application March 18, 1948, Serial No. 15,533

3 Claims. (Cl. 60—97)

This invention relates to hydraulic presses and more particularly to a novel hydraulic transfer molding press wherein a transfer mechanism is operatively associated with a mold mechanism for transferring to the latter material to be molded under pressure.

A general object of the invention is to devise a press such as above described wherein the clamping pressure which holds the mold mechanism in closed position is substantially constant throughout the press cycle.

Another object of the invention is to provide operating means for closing the mold mechanism in the form of a fluid actuated sleeve received within a complementary annular fluid chamber of the press bed or frame and containing a piston or ram operatively associated with the transfer mechanism for actuation thereof.

A further object of the invention is to devise a press of the above-described type which may be lighter and of more economical construction for any predetermined clamping tonnage than presses constructed according to the prior art.

The foregoing and other objects and advantages of the invention will become apparent from a consideration of the following specification and the accompanying drawing wherein the single figure is a central vertical sectional view partly in elevation of an hydraulic transfer molding press embodying the invention.

Referring to the drawing and describing the invention in detail, the press comprises a bed or frame 2 having a fixed platen 4 connected thereto in conventional manner as by tie rods 6. The fixed platen 4 carries a fixed die section, generally designated 8, and comprising a die carrier 10 and a backing plate 12 secured thereto as by screws 14. The backing plate 12 is spaced from the platen 4 as by spacer bars 16 and is clamped thereagainst by clamping plates 18 secured to the platen 4 by bolt and nut assemblies 20.

The die carrier 10 supports male die members 22 adapted to cooperate with female die members 24 to form a mold cavity in the closed position of the die members. The female die members 24 are supported by a backing plate 26 and are contained within a die holder 28. The die members 24 are secured to the plate 26 as by screws 30 and the die holder 28 is secured to the plate 26 as by screws 32. The backing plate 26 is secured to a movable platen 34 by clamping plates 36 connected to the platen 34 by bolt and nut assemblies 38 which clamp the backing plate 26 against spacer bars 40 disposed between the platen 34 and the plate 26.

The die holder 28 contains a sleeve 42 defining a passage 44 communicating by one or more gates 46 with the mold cavity in the closed position of the above-described mold mechanism whereby the material to be molded, which is designated at 48, is forced into the mold cavity by a plunger 52 operating through a complementary passage 50 in the backing plate 26. The passage 50 forms a continuation of the passage 44 and is adapted to contain the plunger 52 in the retracted position thereof illustrated in the drawing.

The plunger 52 is actuated by a rod 54 operatively connected to a piston or ram 56 received within an annular sleeve 58 in substantially fluid-tight engagement therewith. The rod 54 preferably comprises a collar 57 engageable with a packing gland 59 carried by the sleeve 58, whereby the sleeve 58 on its upward advance stroke carries the rod 54 upwardly therewith. The upper end of the sleeve is flanged as at 60 and is provided with an advance conduit 62 and a return or pullback conduit 64 communicating respectively with the interior of the sleeve 58 below and above the piston 56.

The flanged portion 60 of the sleeve 58 engages the movable clamping platen 34 for actuation thereof as hereinafter described in connection with the operation of the press, and the lower end of the sleeve 58 is received within an annular chamber 66 within the press bed or frame 2. The chamber 66 is defined by a cylinder 68 in the bed and a cylindrical projection 70 which is preferably in the form of a removable plug having a readily detachable connection to the bed as, for example, by threads at 72. The lower end of the plug 70 is preferably provided with a nut portion 74 adapted for actuation by any standard wrench. The bed 2 is provided with a conduit 76 adapted to deliver pressure fluid to the lower end of the annular chamber 66.

In operation of the novel press, hydraulic fluid is admitted to the conduit 76 and the annular chamber 66 thereby urging the sleeve 58 and movable platen 34 upwardly under the clamping pressure within the chamber 66 to maintain the mold mechanism in closed position with the die carriers 10 and 28 clamped together and the male and female die members 22 and 24 defining a mold cavity. Under these conditions pressure fluid is admitted to the conduit 62 and is exhausted from the conduit 64 thereby urging the piston 56 and the plunger 52 upwardly to force the material 48 from the passage 44 through the gates 46 into the mold cavity. After a sufficient length of time has elapsed to insure proper setting of the molded material, the die mechanism is opened by release of the pressure in the chamber 66 whereupon the movable platen 34 is actuated downwardly to retracted position either by the force of gravity or by associated pullback motor means (not shown) such as are conventionally used in the art for this purpose. Thereafter the pressure fluid in conduit 62 is exhausted and pressure fluid is admitted to the conduit 64 urging the piston 56 and plunger 52 to their retracted position illustrated in the drawing preparatory to insertion into the passage 44 of another quantity of material to be molded whereupon the above-described cycle is repeated.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In an hydraulic press having a frame, a movable platen with an opening therethrough, and a working element extending through said opening; the combination of a cylinder carried by the frame, a sleeve operatively connected to the platen for actuation thereof, said sleeve having an internal bore of substantially uniform diameter from end to end thereof, the external surface of the sleeve being slidably fitted in the cylinder in substantially fluid-tight engagement therewith, a cylindrical plug carried by the frame and fitted into the bore in substantially fluid-tight engagement with the sleeve, the portion of said bore containing said plug being positively closed thereby at all times against flow of fluid axially of the bore, a piston slidably fitted in said bore in substantially fluid-tight engagement therewith, said piston having an operative connection to said working element for actuation thereof, a fluid inlet port connected to the cylinder between the inner end of the sleeve and the inner end of the cylinder, and a fluid inlet port connected to the bore between the plug and the inner end of the piston, the portion of said bore between the plug and piston being at all times free to flow of fluid in both directions therebetween axially of the bore, and being at all times cut off by said sleeve from fluid communicating with the first mentioned port.

2. An hydraulic press according to claim 1 wherein the plug is removably mounted within an opening extending through the inner end of the cylinder to accommodate removal of the plug without disassembling the sleeve and piston.

3. In an hydraulic press having a frame, a fixed platen carried thereby, a movable platen slidably guided by the frame and having an opening therethrough and a working element extending through said opening; the combination of a cylinder carried by the frame, a sleeve operatively connected to the movable platen and having its external surface slidably fitted within the cylinder in substantially fluid-tight engagement therewith, said sleeve having an internal passage of substantially uniform diameter, a plug carried by the frame and slidably fitted in said passage in substantially fluid-tight engagement therewith for positively preventing flow of fluid axially of the passage, a piston slidably fitted in the passage in substantially fluid-tight engagement therewith, said piston being operatively connected to said element for actuation thereof, and fluid inlet ports connected respectively to the inner end of the cylinder and to a portion of said passage between the piston and plug, said ports being at all times cut off from communicating with each other by said sleeve; the portion of said passage between the piston and plug being at all times free to flow of hydraulic fluid in both directions therebetween axially of the passage.

ROBERT K. SEDGWICK.

REFERENCES CITED

The following references are of record in the file of this patent:

UNITED STATES PATENTS

| Number | Name | Date |
|---|---|---|
| 914,164 | Nelson | Mar. 2, 1909 |
| 1,888,332 | Summey | Nov. 22, 1932 |
| 2,410,909 | Tucker | Nov. 12, 1946 |
| 2,420,405 | Alves | May 13, 1947 |